(12) United States Patent
Baissac et al.

(10) Patent No.: US 12,145,570 B2
(45) Date of Patent: Nov. 19, 2024

(54) METHOD FOR MANAGING A TORQUE TO BE SUPPLIED BY AN ELECTRIC MOTOR

(71) Applicant: VITESCO TECHNOLOGIES GMBH, Regensburg (DE)

(72) Inventors: Jean-Marc Baissac, Toulouse (FR); Magali Pons, Toulouse (FR)

(73) Assignee: VITESCO TECHNOLOGIES GMBH, Regensburg (DE)

( * ) Notice: Subject to any disclaimer, the term of this patent is extended or adjusted under 35 U.S.C. 154(b) by 344 days.

(21) Appl. No.: 17/634,421

(22) PCT Filed: Jul. 7, 2020

(86) PCT No.: PCT/EP2020/069114
§ 371 (c)(1),
(2) Date: Feb. 10, 2022

(87) PCT Pub. No.: WO2021/028123
PCT Pub. Date: Feb. 18, 2021

(65) Prior Publication Data
US 2022/0314960 A1 Oct. 6, 2022

(30) Foreign Application Priority Data
Aug. 13, 2019 (FR) .................................. 1909172

(51) Int. Cl.
H02P 6/16 (2016.01)
B60W 10/08 (2006.01)
(Continued)

(52) U.S. Cl.
CPC ............ B60W 20/13 (2016.01); B60W 10/08 (2013.01); B60W 10/26 (2013.01);
(Continued)

(58) Field of Classification Search
CPC .. H02P 2201/09; H02P 29/40; H02P 23/0031; H02P 2/122; H02P 6/08; H02P 21/20
See application file for complete search history.

(56) References Cited

U.S. PATENT DOCUMENTS 6,348,771 B1   2/2002   Morimoto et al.
7,199,551 B2   4/2007   Gauthier et al.
(Continued)

FOREIGN PATENT DOCUMENTS

CN   104010868 A   8/2014
CN   104024026 A   9/2014
(Continued)

OTHER PUBLICATIONS

International Search Report for PCT/EP2020/069114, mailed Sep. 15, 2020, 4 pages.
(Continued)

Primary Examiner — Karen Masih
(74) Attorney, Agent, or Firm — NIXON & VANDERHYE

(57) ABSTRACT

Disclosed is a method for managing a torque to be supplied on a shaft of an electric motor including the following steps: creating and initializing a correction data table; acquiring a torque instruction; determining a torque command; measuring the current output from the converter and measuring the current output from the battery; calculating an electrical power on the basis of the two current measurements and of the voltage; determining, on the basis of a map, a corresponding torque on the basis of the electrical power at the motor and of the rotational speed of the motor; reading the information provided by the motor relating to the torque exerted on its shaft; calculating the difference between the
(Continued)

information provided by the motor and the torque determined on the basis of the electrical power; and updating the correction data table.

19 Claims, 2 Drawing Sheets

(51) Int. Cl.
| | | |
|---|---|---|
| *B60W 10/26* | (2006.01) | |
| *B60W 20/13* | (2016.01) | |
| *H02P 23/00* | (2016.01) | |
| *H02P 29/40* | (2016.01) | |

(52) U.S. Cl.
CPC .......... *H02P 23/0031* (2013.01); *H02P 29/40* (2016.02); *B60W 2510/083* (2013.01); *B60W 2510/244* (2013.01); *B60W 2556/25* (2020.02); *B60W 2710/083* (2013.01); *B60W 2710/086* (2013.01)

(56) References Cited

U.S. PATENT DOCUMENTS

| | | |
|---|---|---|
| 2005/0068003 A1 | 3/2005 | Gauthier et al. |
| 2014/0034985 A1 | 2/2014 | Pan et al. |
| 2014/0346985 A1 | 11/2014 | Magne et al. |
| 2014/0361612 A1 | 12/2014 | Magne et al. |

FOREIGN PATENT DOCUMENTS

| | | | |
|---|---|---|---|
| DE | 102015222126 A1 * | 3/2017 | ............... B60K 6/48 |
| FR | 2 799 163 A1 | 4/2001 | |
| FR | 3025755 | 3/2016 | |
| WO | 2013/092752 A1 | 6/2013 | |

OTHER PUBLICATIONS

Office Action issued in Chinese Patent Application No. 202080056983.4 dated May 16, 2023.

* cited by examiner

METHOD FOR MANAGING A TORQUE TO BE SUPPLIED BY AN ELECTRIC MOTOR

This application is the U.S. national phase of International Application No. PCT/EP2020/069114 filed 7 Jul. 2020, which designated the U.S. and claims priority to FR Patent Application No. 1909172 filed 13 Aug. 2019, the entire contents of each of which are hereby incorporated by reference.

BACKGROUND OF THE INVENTION

Field of the Invention

The invention relates to the field of the management of an electromechanical system which uses a converter, which might or might not be a bidirectional converter, to convert electrical power into mechanical torque.

The invention may relate more particularly to the management of an electric motor, for example an electric motor used for the motorization of a motor vehicle, and more particularly still an electric motor coupled to a combustion engine (hybrid vehicle).

Description of the Related Art

In an onboard system, for example a motor vehicle, an electric motor is supplied with electric current by a battery and transforms the electrical energy "stored" in the battery into mechanical torque transmitted to the wheels of the vehicle in order to drive the latter. Most often, in reverse, the electric motor also functions as a generator, by transforming mechanical energy (during braking or supplied by a combustion engine) into electrical energy used to charge the battery.

To avoid damaging the battery, the strength of the electric current flowing to the terminals of the battery should be limited. The maximum strength (whether during the charging or discharging of the battery) of this current depends greatly on parameters such as, for example, the temperature of the battery, its state of charge, etc. Care should be taken not to exceed this maximum current in order to preserve the battery. A battery monitoring device (known by the abbreviation BMS for battery management system) is then provided so as to determine, according to parameters such as those mentioned above, and to communicate the current strength limits not to be exceeded at the terminals of the battery.

In a vehicle, instructions given by the driver are received by a motor management system which "translates" them into a load, that is to say a torque, to be supplied by the motor shaft. The electric motor is therefore required to provide a predetermined torque. However, for a battery, the current supplied and the voltage across the terminals of the battery, that is to say the power supplied by the battery, are known. The power supplied to the electric motor is therefore known.

Manufacturers of electric motors provide maps for their motors which make it possible to know the efficiency of the motor (ratio of the mechanical energy delivered at output to electrical power consumed) according to data such as, for example, the rotational speed of the motor and the mechanical torque delivered at output. These maps then make it possible to determine a maximum torque that can be obtained based on an electrical power and a rotational speed of the motor.

Document FR3025755A1 is known which relates to a method for limiting the torque of an electric motor of a vehicle comprising a traction battery, comprising: —a step of determining available mechanical power according to a motor loss map, —a step of correcting available mechanical power using an integral corrector on an estimate of the maximum power available in said battery, —a step of limiting the motor torque according to the determined available mechanical power, or according to the corrected available mechanical power, —a step of updating means for estimating motor losses comprising said map when the limiting step uses said corrected available mechanical power.

However, these maps relate each time to a type of electric motor and are not adapted to a particular motor, i.e. due to different tolerances during manufacture, there will be variations in efficiencies (and therefore also maximum torques) in a sample of electric motors of the same series. Then there are also drifts in the map with time over the service life of the motor depending on its mode of use, its wear, etc.

The data that are obtained are then approximate and therefore cannot be used when it comes to optimizing the management of a hybrid vehicle by making the best use of both the electric motor and the combustion engine.

The object of the present invention is therefore to estimate as accurately as possible a maximum available torque that can be supplied by an electric motor without having to use a specific sensor measuring said torque.

SUMMARY OF THE INVENTION

What is provided is a method for managing a torque to be supplied on a shaft of an electric motor in a system comprising the electric motor, a battery for supplying the electric motor with power, a DC-to-DC converter connected between the battery and the motor and an electrical management device.

According to the present invention, such a method comprises the following steps:
  creating and initializing a correction data table,
  acquiring a torque instruction for the torque to be exerted on the motor shaft from a central management unit,
  determining a torque command on the basis of the received torque instruction and of a datum from the correction data table corresponding thereto,
  measuring the current output from the converter and measuring the current output from the battery,
  calculating an electrical power on the basis of the two current measurements from the preceding step and of the voltage across the terminals of the motor,
  determining, on the basis of a map associated with the motor, a corresponding torque on the basis of the electrical power at the motor and of the rotational speed of the motor,
  reading the information provided by the motor relating to the torque exerted on its shaft,
  calculating the difference between the information provided by the motor relating to the torque exerted on its shaft and the torque determined on the basis of the electrical power at the motor and of the map associated with the motor,
  potentially updating the correction data table according to the difference determined in the preceding step.

By virtue of the correction data table and the continuous updating thereof, the map is adapted in real time. It is then possible to better manage the performance of the motor and the battery without risking damage to the latter. This improved management makes it possible to optimize the use of the electric motor of a hybrid vehicle (and therefore to limit the emission of $CO_2$) without having to implement a new sensor, such as, for example, an (expensive) torque measurement sensor measuring the torque exerted on the motor shaft.

When initializing the correction data table, the values of this table may be initialized at 0, preferably in the factory, that is to say before the vehicle is put into service.

This management method may be implemented when the motor is used as a motor generating torque on its shaft or when the motor is used as a generator to charge the battery.

According to another aspect, what is provided is a computer program comprising instructions for implementing all or some of a method as defined herein when this program is executed by a processor. According to another aspect of the invention, what is provided is a non-transient storage medium, readable by a computer, on which such a program is stored.

The present invention also relates to a device for managing a torque on an electric motor shaft comprising a battery and a DC-to-DC converter, characterized in that it further comprises electronic means for implementing each of the steps of a management method defined above.

Lastly, the present invention relates to a vehicle provided with an electric motor, characterized in that it further comprises a management device as defined in the preceding paragraph. This vehicle may be propelled only by one or more electric motors or it may be a hybrid vehicle with at least one electric motor and a combustion engine.

BRIEF DESCRIPTION OF THE DRAWINGS

Other features, details and advantages of the invention will become apparent from reading the following detailed description and analyzing the appended drawings, in which.

DESCRIPTION OF THE PREFERRED EMBODIMENTS

The drawings and the following description contain mostly elements of a certain nature. They may therefore be used not only to better understand the present invention, but also for contributing to the definition thereof, where applicable.

Figure 1:
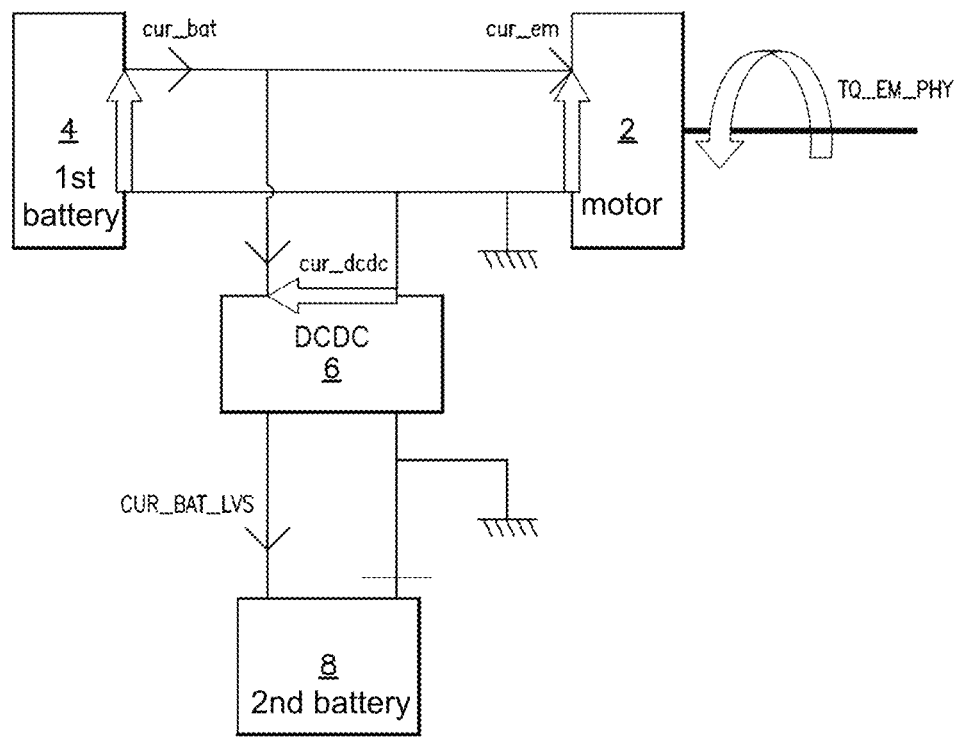
FIG. 1 schematically shows a power supply for an electric motor of a hybrid vehicle.

Reference is now made to FIG. 1. This figure shows a diagram which is known to those skilled in the art working in the field of vehicles driven by at least one electric motor. It may be a hybrid vehicle, that is to say a vehicle equipped both with a combustion engine and with at least one electric motor, but it may also be a vehicle driven only by electric motors. In FIG. 1, a motor 2 corresponding to the electric motor of such a vehicle is supplied with direct current by a first battery 4 which in parallel supplies a DC-to-DC converter 6 connected to a second battery 8.

The first battery 4 is typically a battery that initially has a no-load voltage across its terminals of between 36 and 52 V. It comprises a plurality of interconnected cells to provide this voltage, these cells being distributed on board the vehicle. The first battery 4 is shown here in a simplified manner.

The DC-to-DC converter 6 is connected in parallel with the first battery 4 and allows the second battery 8 to be charged.

The second battery 8 conventionally delivers a voltage of the order of 12 V and corresponds to a battery such as is conventionally found in an electric, hybrid or combustion engine motor vehicle.

Since the structure for the power supply of the motor 2 is known to those skilled in the art, it would be unnecessary to describe it in greater detail here.

Figure 2:
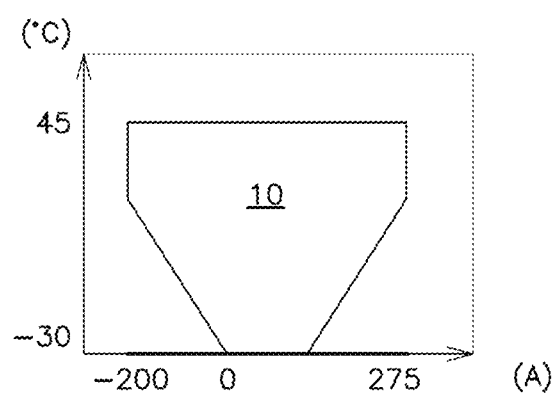
FIG. 2 is an example of a current/temperature diagram showing a region within which the current at the terminals of an electric battery must be maintained.

FIG. 2 is a graph with a current strength I (in amperes A) on the X-axis and a temperature T (in degrees Celsius ° C.) on the Y-axis. It is estimated that when the operating point (I, T) is in region 10, the first battery 4 is operating normally. Outside this region 10, the first battery 4 may be in a poor state (loss of electric charge, drop in performance, etc.). It is therefore necessary to ensure that the current flowing through the circuit over the terminals of the first battery 4 is limited, as a function of operating temperature, so that the operating point of the first battery remains in the region 10.

The motor 2 may also operate as a generator, for example during a deceleration phase. In FIG. 2, when the current strength I is positive, the first battery 4 is delivering current while, when the current strength I is negative, the first battery 4 is being charged.

Figure 3:
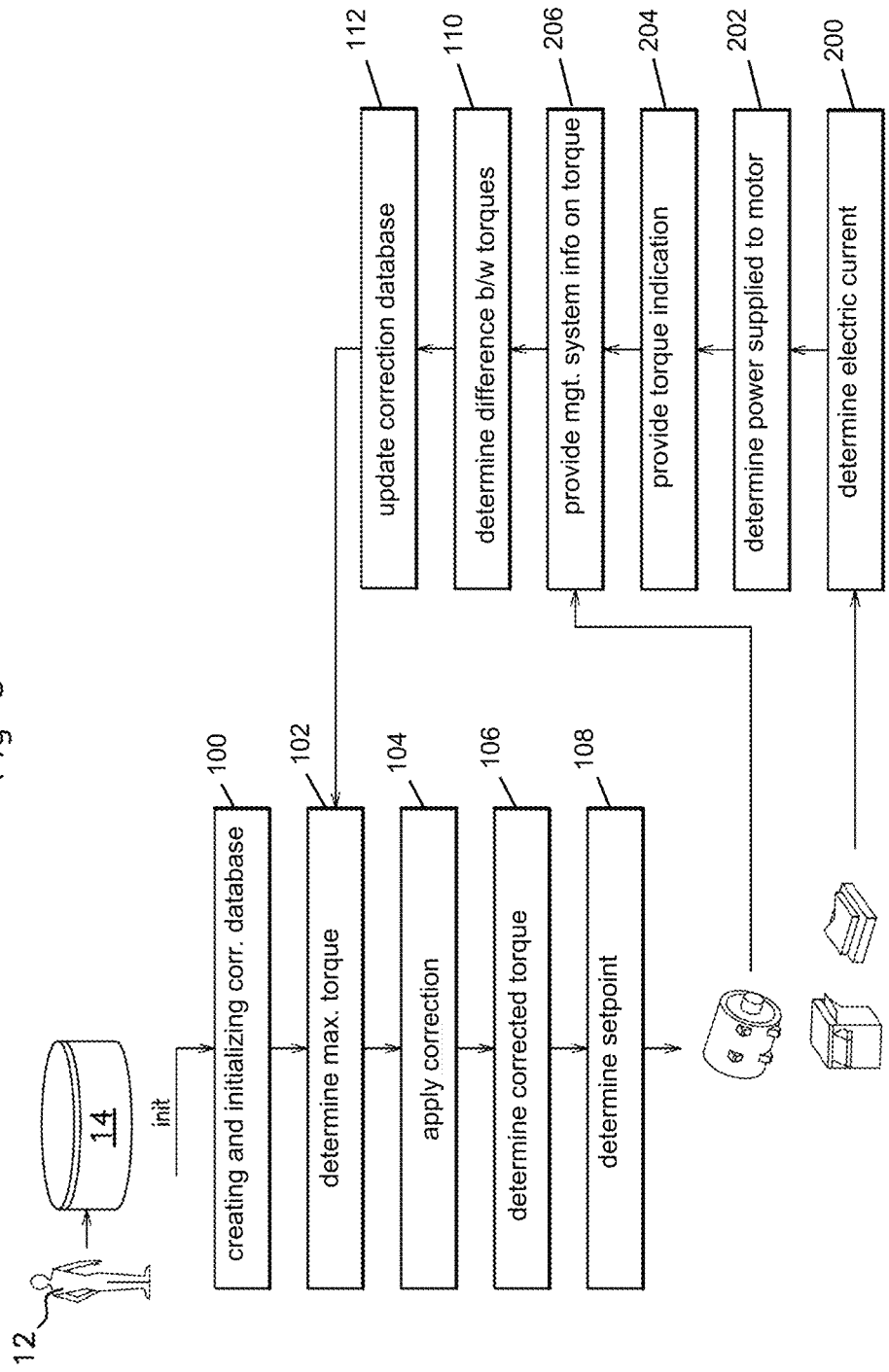
FIG. 3 is a flowchart for a method for managing the torque to be supplied by the motor of FIG. 1.

FIG. 3 illustrates a method for managing the motor 2 so that it delivers a predetermined torque.

A manufacturer 12 of electric motors supplies the motor 2 with a first database 14 which indicates for the motor 2 the efficiency Eff of the motor as a function of its rotational speed and of the torque at output. Specifically, the motor 2 has an output shaft which has a rotational speed n_em and on which a torque tq_em is exerted.

Let pow_em be the power supplied to the motor 2 when it is operating as a motor. There is then the following formula:

$$\text{Pow\_em} = (\text{pi} * n\_\text{em} * \text{tq\_em})/30/\text{Eff}$$

Where pi is the ratio of a circle's circumference to its diameter and Eff is a factor between 0 and 1.

When the motor 2 is operating as a generator, it delivers a power pow_em such that:

$$\text{Pow\_em} = \text{Eff} * (\text{pi} * n\_\text{em} * \text{tq\_em})/30$$

This first database 14 is provided by the manufacturer. It corresponds to measurements made on a test bench. This database is not specific to the motor 2 but is common to all motors of the same type as the motor 2 manufactured by the manufacturer 12. Thus, this database cannot be perfectly accurate due to the manufacturing tolerances in the motors produced by the manufacturer 12. In addition, over the service life of the motor 2, its characteristics change.

It is now assumed that the motor 2 is used as a motor to simplify the description and to avoid systematically providing for two cases in parallel. Reasoning similar to that presented below holds for a motor 2 operating as a generator.

The first database 14 is used to produce a 3D map which makes it possible to determine a torque tq_em according to the power pow_em delivered to the motor 2, the rotational speed n_em of the motor and the voltage v_em across the terminals of the motor 2.

A first step 100 is a step of creating and initializing a second database, called the correction database. The data in this database are, for example, all set to zero (0) during the initialization of this database. It is then assumed that the map which has been produced is true for the motor 2. This map may be considered as a function map_mot which has three input data: the electric power supplied to motor 2, its output speed and the voltage across the terminals of the motor 2, while the correction database may be considered as a function mot_err which has the same three input data: the electric power supplied to motor 2, its output speed and the voltage across the terminals of the motor 2.

A second step 102 provides for determining the maximum torque tq_mot_lim that can be exerted by the motor 2. This torque is determined according to the maximum current strength that the first battery 4 can provide. On the basis of this current strength, which depends on a number of parameters such as, for example, the temperature, the state of charge and the state of health of the first battery 4, a maximum power pow_mot_lim can be delivered to the motor 2. The 3D map makes it possible to determine a value for tq_mot_lim:

Tq_mot_lim=map_mot(pow_mot_lim,$n$_em,$v$_em)

Now, conventionally, in a vehicle with at least one electric motor, there are sensors that make it possible to determine the temperature, the rotational speed of the electric motor and the voltage across the terminals of the motor.

As indicated above, the value given by the 3D map is an approximate value. Provision is therefore made, in a third step 104, to apply a correction tq_mot_err thereto which is extracted from the correction database. The data in the latter change over time as explained below.

Specifically: tq_mot_err=mot_err(pow_mot_lim, $n$_em,$v$_em)

With this corrective term, it is then possible, in a fourth step 106, to determine a corrected torque tq_mot_lim_corr:

tq_mot_lim_corr=tq_mot_lim+tq_mot_err

A management system for the vehicle continuously determines a torque tq_em_pt for the motor 2 as torque setpoint to be exerted. A management system for the electric motor 2 determines what torque the motor 2 should exert. The characteristics of the first battery 4 should be taken into account here so as not to risk damaging it. In a fifth step 108, the setpoint to be sent to the motor 2, tq_em_sp is determined as being the minimum value between tq_em_pt, on the one hand, and tq_mot_lim_corr, on the other hand.

This setpoint value tq_em_sp is then supplied to the motor 2.

Continuously (operation 200), at the first battery 4 and at the DC-to-DC converter 6, the management system for the vehicle measures, on the one hand, the current flowing into the first battery cur_bat and the current consumed by the DC-to-DC converter 6, i.e. cur_dcdc. Knowing these two currents makes it possible to determine the electric current being supplied to the motor 2, which current is called cur_em.

On the basis of this current value cur_em, knowing v_em, it is possible to determine the power pow_em being supplied to motor 2 (operation 202):

Pow_em=cur_em*$v$_em

The 3D map, obtained using the manufacturer's database, gives a torque indication based on the measurement of electrical power: tq_mot_mes.

An operation 204 then gives this torque indication:

tq_mot_mes=map_mot(pow,$n$_em,$v$_em)

Conventionally, the motor 2 gives the management system information on the torque delivered: TQ_EM_PHY (operation 206).

In a sixth step 110, the difference between the torque estimated according to the current and voltage measurements made (tq_mot_mes) and the torque delivered by the motor TQ_EM_PHY is noted.

Let tq_err=TQ_EM_PHY−tq_mot_mes

If this value is zero, then the setpoint given indeed corresponds to what motor 2 has delivered.

If, however, a difference is observed, the correction database should be updated. A seventh step 112 is then provided in order to update the value tq_mot_err corresponding to the power pow_mot_lim, to the motor speed n_em and to the voltage v_em.

In this way, the correction database is filled in as the operating cycles of the vehicle with the electric motor 2 progress. Thus the map is adjusted over time by virtue of the use of the correction database.

It is thus possible to make the best use of the possibilities of the first battery 4 without running the risk of damaging it. The use of the electric motor 2 may thus be optimized. Consequently, in the case of use in a hybrid vehicle, it is thus possible to limit the fuel consumption of the combustion engine associated with the motor 2 in order to drive the corresponding vehicle. $CO_2$ emissions may thus be minimized.

Likewise, it is possible to optimize the operation of the motor 2 when the latter is used as a generator. The battery is thus charged better, which increases the "electric" range of the vehicle and therefore also limits $CO_2$ emissions overall.

This increase in performance is obtained without having to add expensive sensors (such as a torque sensor, for example).

In addition, time is saved in the development of the system proposed here because no post-processing is necessary during the manufacture of the vehicle.

The present invention is particularly well suited for use in a hybrid vehicle. However, it may find application in other electromechanical systems.

The invention claimed is:

1. A method for managing a torque to be supplied on a shaft of an electric motor in a system including the electric motor, a battery configured to supply the electric motor with power, and a DC-to-DC converter connected between the battery and the motor, the method comprising:
   creating and initializing a correction data table;
   acquiring a torque instruction for a torque to be exerted on the motor shaft from a central management device;
   determining a torque command based on the received torque instruction and a datum from the correction data table corresponding thereto;
   measuring a current output from the converter and measuring a current output from the battery;
   calculating an electrical power based on the two measured current outputs and a voltage across terminals of the motor;
   determining, based on a map associated with the motor, a corresponding torque based on the electrical power at the motor and a rotational speed of the motor;
   reading information provided by the motor relating to the torque exerted on the shaft of the motor;
   calculating a difference between the information provided by the motor relating to the torque exerted on the shaft of the motor and the torque determined based on the electrical power at the motor and the map associated with the motor; and potentially updating the correction data table according to the calculated difference.

2. The management method as claimed in claim 1, wherein values of the correction data table are initialized at 0 in a factory.

3. The management method as claimed in claim 1, wherein the motor is used as a motor generates the torque on the shaft of the motor.

4. The management method as claimed in claim 1, wherein the motor is used as a generator to charge the battery.

5. A non-transitory computer-readable medium on which is stored a computer program, comprising a series of code instructions to implement the method for managing the torque of the electric motor shaft as claimed in claim 1, when the method is implemented by a computer.

6. A device for managing a torque to be supplied on a shaft of an electric motor in a system including the electric motor, a battery for supplying the electric motor with power, a DC-to-DC converter connected between the battery and the motor and an electrical management device, the device comprising:
   at least one electronic processor configured to implement the method as claimed in claim 1.

7. A vehicle provided with an electric motor, the vehicle comprising:
   the device of claim 6.

8. The management method as claimed in claim 2, wherein the motor generates the torque on the shaft of the motor.

9. The management method as claimed in claim 2, wherein the motor is used as a generator to charge the battery.

10. A non-transitory computer-readable medium on which is stored a computer program, comprising a series of code instructions to implement the method for managing the torque of the electric motor shaft as claimed in claim 2, when the method is implemented by a computer.

11. A non-transitory computer-readable medium on which is s stored a computer program, comprising a series of code instructions a to implement the method for managing the torque of the electric motor shaft as claimed in claim 3, when the method is implemented by a computer.

12. A non-transitory computer-readable medium on which is stored a computer program, comprising a series of code instructions to implement the method for managing the torque of the electric motor shaft as claimed in claim 4, when the method is implemented by a computer.

13. A non-transitory computer-readable medium on which is stored a computer program, comprising a series of code instructions to implement the method for managing the torque of the electric motor shaft as claimed in claim 8, when the method is implemented by a computer.

14. A non-transitory computer-readable medium on which is stored a computer program, comprising a series of code instructions to implement the method for managing the torque of the electric motor shaft as claimed in claim 9, when the method is implemented by a computer.

15. A device for managing a torque to be supplied on a shaft of an electric motor in a system including the electric motor, a battery for supplying the electric motor with power, a DC-to-DC converter connected between the battery and the motor and an electrical management device, the device comprising:
   at least one electronic processor configured to implement the method as claimed in claim 2.

16. A device for managing a torque to be supplied on a shaft of an electric motor in a system including the electric motor, a battery for supplying the electric motor with power, a DC-to-DC converter connected between the battery and the motor and an electrical management device, the device comprising:
   at least one electronic processor configured to implement the method as claimed in claim 3.

17. A device for managing a torque to be supplied on a shaft of an electric motor in a system including the electric motor, a battery for supplying the electric motor with power, a DC-to-DC converter connected between the battery and the motor and an electrical management device, the device comprising:
   at least one electronic processor configured to implement the method as claimed in claim 4.

18. A device for managing a torque to be supplied on a shaft of an electric motor in a system including the electric motor, a battery for supplying the electric motor with power, a DC-to-DC converter connected between the battery and the motor and an electrical management device, the device comprising:
   at least one electronic processor configured to implement the method as claimed in claim 8.

19. A device for managing a torque to be supplied on a shaft of an electric motor in a system including the electric motor, a battery for supplying the electric motor with power, a DC-to-DC converter connected between the battery and the motor and an electrical management device, the device comprising:
   at least one electronic processor configured to implement the method as claimed in claim 9.

* * * * *